United States Patent Office 2,882,287
Patented Apr. 14, 1959

2,882,287
METHYLBUTYNYL STEARATE

Daniel Cook Rowlands, Worthington, and William H. Gillen, Columbus, Ohio, assignors, by mesne assignments, to The Air Reduction Company, Inc., New York, N.Y., a corporation of New York No Drawing. Application August 30, 1954
Serial No. 453,142

1 Claim. (Cl. 260—410.9)

This invention relates to a novel chemical compound and to a method of preparing same.

More particularly, the invention is concerned with the new substance methylbutynyl stearate which can be represented by the following formula:

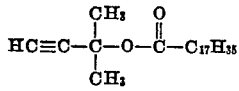

This new compound, methylbutynyl stearate, has been found to be useful as a compounding agent for GR-S rubbers. In this regard, it has been found that as little as ten (10) percent by weight of methylbutynyl stearate was sufficient to afford plasticization, as illustrated by an increase in both total elongation and flexibility, of GR-S compositions. The compound also can be used to plasticize other resinous products such as vinyl chloride resins, exemplified by Geon 101. In addition, methylbutynyl stearate may serve as a heat stabilizer for vinyl chloride resins when admixed together with such materials.

This novel compound may be prepared by reacting 3-methyl-1-butyn-3-ol with stearyl chloride in the presence of an halogen acid acceptor, such as pyridine, and a solvent at elevated temperatures.

The following example will more fully illustrate the preparation of methylbutynyl stearate.

Example 3-methyl-1-butyn-3-ol (68.9 g., 0.82 mole) and pyridine (64.9 g., 0.82 mole) were placed in a flask with benzene as a solvent (300 ml.). The mixture was stirred and heated in the range of 50°-60° C. and stearyl chloride (220 g., 0.72 mole) in 225 ml. of benzene was added dropwise during two hours. The reactants were stirred and heated (50°-60° C.) for an additional 3½ hours and were allowed to stand for a period of about 48 hours at room temperature. Water was added to dissolve the pyridine hydrochloride which had formed, and the benzene layer was washed with dilute hydrochloric acid and more water. The product in benzene was dried over sodium sulfate and concentrated in vacuo until essentially all the benzene had been removed. Acetone (500-600 ml.) was added and the mixture was cooled to 0° C. The precipitated solid was filtered off and air dried. It weighed 29.0 g. and was probably impure stearic acid. The acetone filtrate was concentrated on a steam bath under diminished pressure until the residue was free of solvent. The crude stearate ester (199 g., 79% yield) was distilled. A charge of 166 g. produced 152 g. of distillate (175°-185° C./1 mm.) and 10 g. of solid residues. The distillate was diluted with four parts of Skellysolve A and passed through six inches of 28 to 200-mesh silica gel followed by nine inches of 80-200-mesh alumina that was supported in a 17-mm. O.D. glass tube. The Skellysolve was then evaporated to produce a clear colorless liquid residue, which was heated and agitated under vacuum (0.4 mm.) for some time to remove all of the solvent. The yield of methylbutynyl stearate was 140 g. (0.40 mole) or 67 percent of the theoretical; M.P. about 16° C., the acid number of this material was 1.2, corresponding to about 0.9 percent stearic acid as an impurity.

Methylbutynyl stearate will not react with aqueous ammoniacal silver nitrate, but does react with silver nitrate in ethanol to give a copious precipitate. This precipitate is organic in nature. It melts at 53°-56° C. and burns with a large yellow flame leaving behind a white, saltlike residue.

What is claimed is:
Methylbutynyl stearate.

References Cited in the file of this patent
UNITED STATES PATENTS

| | | |
|---|---|---|
| 2,207,611 | Coleman et al. | July 9, 1940 |
| 2,712,515 | Beutel | July 5, 1955 |

FOREIGN PATENTS

| | | |
|---|---|---|
| 505,421 | Belgium | Sept. 15, 1951 |

OTHER REFERENCES

Johnson: Chem. of Acetylenic Cpds., vol. 1, Edward Arnold & Co., London (1946), pp. 37 and 276.

Wakeman: Chemistry of Commercial Plastics, 1947, pp. 218, 320, 545.

Woodcock: Ester Plasticizers, Rubber Age, vol. 69, April 1951, pp. 51-2.